Dec. 13, 1927. 1,652,264
O. ZERK, NOW BY JUDICIAL CHANGE OF NAME O. U. ZERK
LUBRICATING DEVICE
Filed March 14, 1921
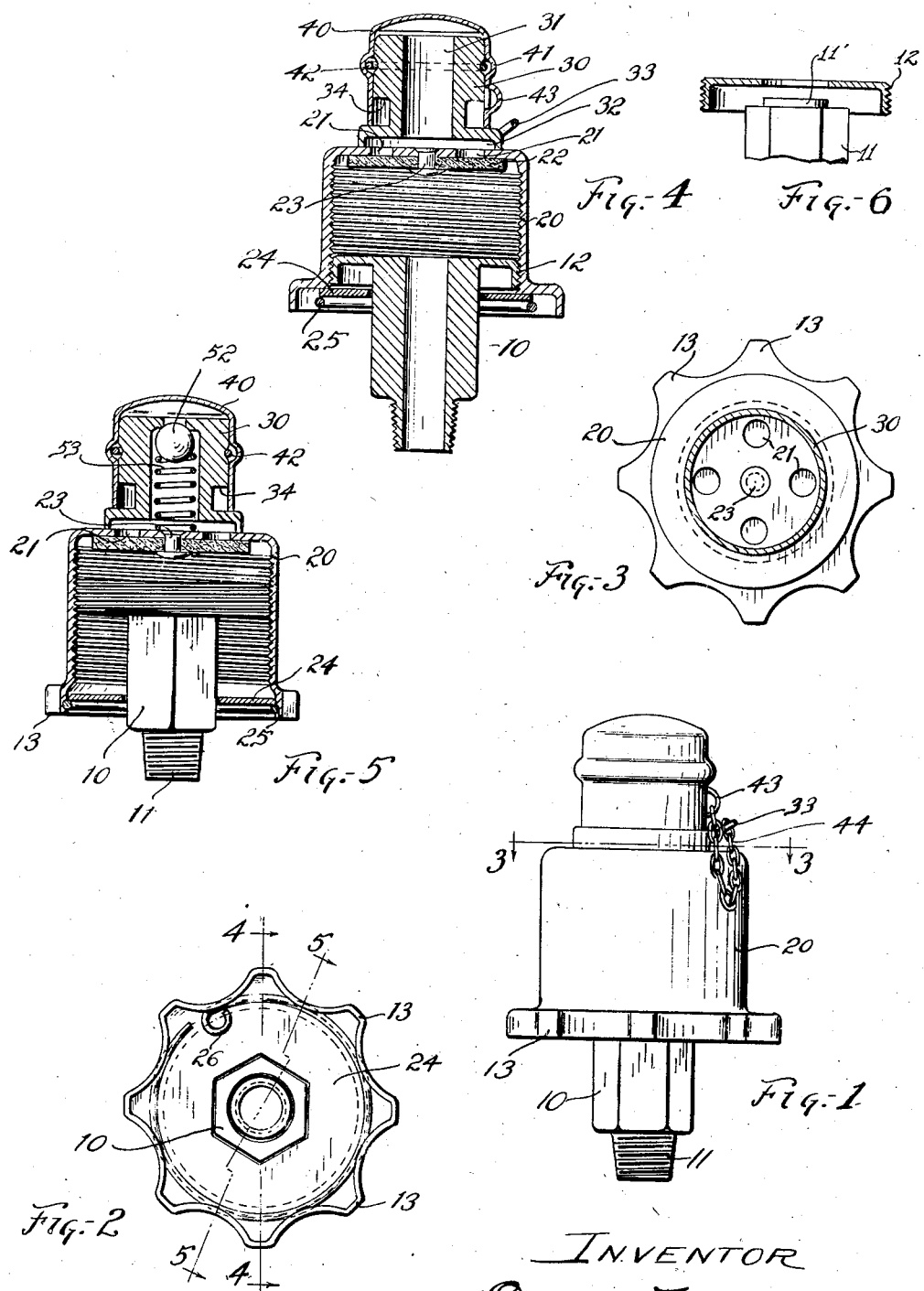

Patented Dec. 13, 1927.

1,652,264

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICATING DEVICE.

Application filed March 14, 1921. Serial No. 452,133.

My invention relates to a lubricating device. One of the objects of the invention is to provide a grease cup which may be readily filled without disassembling it.

Another object is to provide a grease cup of the type in which the cover is screwed onto the grease in the chamber and in which the threads of the cup are entirely protected against grit and dirt.

Another object is to provide such a cup which shall prevent accidental separation of parts, but will allow their ready separation by the operator when desired.

Other objects of the invention will be apparent in the course of the following description, and the features of novelty will be pointed out in the claims.

Referring to the drawings in which a preferred embodiment of my invention is explained, Fig. 1 is a side view of the device; Fig. 2 is a bottom plan view thereof; Fig. 3 is a section on line 3—3 of Fig. 1; Fig. 4 is a section on line 4—4 of Fig. 2; Fig. 5 is a section substantially on line 5—5 of Fig. 2 but showing the use of a second valve; Fig. 6 is a fragmentary view illustrating the manner in which I prefer making the nipple member.

My grease cup comprises a nipple or foot member 10, which may have a non-circular shank for enabling its ready manipulation by a suitable tool or by hand for screwing it into place. I prefer to make this member of two parts, as shown in Fig. 6, the lower tubular portion 11 being made with an angular shank and lower threaded end and preferably with a circular rib 11' projecting from its upper end. The annular member 12, which may be cupped and threaded on its sides, has its central opening slightly greater than that of the rib 11'. so that these members may be welded together to form one piece as shown in Fig. 4.

A cover 20 is provided, preferably in the form of a cup member made of a stamping of sheet metal and having interior threads adapted to engage with the outer threads of the member 10 and when secured in this position these members form between them a grease chamber, the outer cover being preferably provided with a suitable check valve in a passageway leading into the grease chamber. Considered as a cup, the cover 20 has its bottom outermost and its top opens in toward the bearing. As the device may, and often will be mounted in horizontal or downwardly extending position with respect to the bearing to be lubricated, it is obvious that no orientation with respect to the vertical is meant by the words "bottom" or "top".

A particular advantage of the flat outer surface on the nipple 10 consists in the fact that as grease is forced into the grease chamber through the inlet passageway, the air contained in the chamber may escape between the threads of the member 10 and cover 20, whereas, if the sides of the member 12 projected outward, air would be trapped within the chamber which would interfere with the proper feeding of the grease from the chamber, and the proper filling of the chamber with grease.

Adjacent its inner end the cover member 20 is preferably flanged outwardly to form the projections or teeth 13 whereby it is adapted to be readily turned by the operator. In this end I insert member 24 provided with a non-circular opening complementary to and adapted to fit the shank of member 10. The member 24 may be retained in position by means of the spring ring 25 seated in interior grooves formed in the portions of member 20, between the teeth 13. The spring 25 is preferably formed with a looped end 26 which facilitates its removal by the operator. The opening in the annulus 24 is of such size as to closely fit the shank of foot 10 so that the ring 24 extends closely adjacent to the shank of member 10 and forms an effective means for preventing grit and dirt from being deposited upon the threads of the cover 20. This annular member and the spring 25 also prevent accidental separation of the cover from the foot 10, but the cover may be readily removed by the operator by unseating the spring from its grooves.

The outer end of member 20 is provided with suitable openings 21 which are normally closed by means of a check valve which consists in the form here illustrated of a leather disk 22 which may be suitably secured as by means of a rivet 23 to the end wall of the cover 20. Suitably secured upon the outer face of this wall is the head 30. If desired this head might be made integral with the rest of the cover. This member may be attached by welding or in any approved manner to the cover and has a longitudinal feed opening 31 communicating with the transverse channel 32 which communicates with the openings 21.

The head 30 has an enlarged outer portion whereby the shoulder 34 is formed which serves as an abutment for securing the end of a coupling which may be applied to connect the grease cup with a grease gun.

A suitable dust cap 40 may be held in position by any suitable locking means such as the means I have shown, comprising the spring 42, which may be seated in the groove 41 on the cap, and is adapted to snap into the groove formed on the head 30. A suitable attaching member 43 may be stamped up from the dust cap 40, or may comprise an eyelet suitably attached thereon. This eyelet forms a means for attaching a chain 44. The other end of the chain may be secured to the eyelet 33 on the head 30. This construction of the dust cap and retaining member is fully shown, described and claimed by me in my co-pending application, Serial No. 452,123 filed March 14, 1921.

In Fig. 5 I have illustrated the use of the ball check valve arrangement. In other respects the device is such as illustrated in Fig. 4. It will be seen that the end of the cover 20 furnishes a suitable abutment for the end of the spring 53 in the structure shown in Fig. 5. It may be desired to use two check valves in order to absolutely and doubly insure against leakage.

It will be seen that the head in the different views is in each case provided with a comparatively long enlarged portion which provides a guiding means for the positioning of the grease gun coupling so as to insure a tight seal as it is forced into place and into locking position on the shoulder 34. It will be noticed that where the ball valve is used, this brings the locking abutment 34 inward of the ball seat. Thus I insure a feed of the grease without leakage from the gun to the grease cup.

It will be seen that my device comprises a check valve which will effectively prevent leakage of grease, and as the cover is screwed inwardly, the pressure of the grease within the chamber will tightly close the valve. It will further be seen that the parts are fully protected from access of dirt and grit.

It will be further seen that my device comprises an arrangement whereby the trapping of air within the grease chamber is prevented, since air will escape between the threads of the cover and nipple, as the cover is turned.

While I have described a specific embodiment of my invention, it will be apparent that many changes might be made therein, and that many other forms of device might be made which would involve the principles of my invention, and therefore, the foregoing description is to be taken as illustrating a specific embodiment of the invention rather than as restricting its character and scope.

Having thus described my invention, I claim:

1. A grease cup comprising a foot member, a cup threaded over said member, a valved opening in the bottom of said cup for filling the same, said valve being inside said cup, and a terminal mounted on the outside of said cup for connecting to an injector.

2. A grease cup comprising a foot member, a cup threaded over said member, a valved opening in the bottom of said cup for filling the same, and a terminal mounted on the outside of said cup, said terminal having a check valve in series with the valve for said opening.

3. A grease cup comprising a foot member, a cup threaded over said member, said cup having a plurality of spaced openings in the bottom thereof, a terminal housing mounted on said cup over said openings and having a central valved inlet, and a single flexible member overlying all said openings to function as a check valve for them.

4. A grease cup comprising a foot member, a cup threaded over said member, said cup having a plurality of spaced openings in the bottom thereof, a terminal housing mounted on said cup over said openings and having a central inlet, and a single flexible member overlying all said openings to function as a check valve for them.

In testimony whereof, I hereunto affix my signature.

OSCAR ZERK.

*Now by Judicial Change of Name Oscar Ulysses Zerk.*